US011294071B2

(12) United States Patent
Im et al.

(10) Patent No.: US 11,294,071 B2
(45) Date of Patent: Apr. 5, 2022

(54) APPARATUS FOR DETERMINING PRECISE LOCATION AND METHOD FOR DETERMINING PRECISE LOCATION IN WOODLANDS

(71) Applicant: KOREA AEROSPACE RESEARCH INSTITUTE, Daejeon (KR)

(72) Inventors: Sung Hyuck Im, Daejeon (KR); Moon Beom Heo, Daejeon (KR); Eun Sung Lee, Sejong (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/777,035

(22) PCT Filed: Nov. 18, 2016

(86) PCT No.: PCT/KR2016/013336
§ 371 (c)(1),
(2) Date: May 17, 2018

(87) PCT Pub. No.: WO2017/086736
PCT Pub. Date: May 26, 2017

(65) Prior Publication Data
US 2018/0356532 A1    Dec. 13, 2018

(30) Foreign Application Priority Data
Nov. 18, 2015 (KR) .......................... 10-2015-0161563

(51) Int. Cl.
*G01S 19/42* (2010.01)
*G01S 19/03* (2010.01)
(Continued)

(52) U.S. Cl.
CPC ............ *G01S 19/42* (2013.01); *B64C 39/024* (2013.01); *G01S 1/68* (2013.01); *G01S 5/0063* (2013.01);
(Continued)

(58) Field of Classification Search
None
See application file for complete search history.

(56) References Cited

U.S. PATENT DOCUMENTS

| 7,084,809 | B2* | 8/2006 | Hockley, Jr. .......... | G01S 5/0072 342/357.48 |
| 8,315,794 | B1* | 11/2012 | Strelow .................. | G05D 1/104 701/2 |
| 2013/0045759 | A1* | 2/2013 | Smith .................... | H04W 4/023 455/456.6 |

FOREIGN PATENT DOCUMENTS

| KR | 20030068871 A | 8/2003 |
| KR | 20090080674 A | 7/2009 |

(Continued)

OTHER PUBLICATIONS

"Ultra-Wideband Wireless Systems", G. Roberto Aiello and Gerald D. Rogerson, IEEE microwave magazine, Jun. 2003 (Year: 2003).*
(Continued)

*Primary Examiner* — Yuen Wong
*Assistant Examiner* — Hongye Liang
(74) *Attorney, Agent, or Firm* — McCoy Russell LLP

(57) ABSTRACT

An apparatus for determining a precise location including: a plurality of unmanned aerial vehicles each having a first broadband signal module and a global position system GPS receiver attached thereonto and flying in the air; and a terminal provided at a location and determining the location by communication with the first broadband signal modules. In addition, a method for determining a precise location including: respective GPS receivers receiving GPS signals
(Continued)

from artificial satellites and detecting locations of each of the plurality of unmanned aerial vehicles, transmiting locations of the unmanned aerial vehicles and distances between the unmanned aerial vehicles and the terminal and determining a location of the terminal using information received from the first broadband signal modules.

4 Claims, 3 Drawing Sheets

(51) Int. Cl.
*H04W 64/00* (2009.01)
*G01S 5/02* (2010.01)
*G01S 19/14* (2010.01)
*G01S 5/14* (2006.01)
*G01S 1/68* (2006.01)
*G01S 5/00* (2006.01)
*B64C 39/02* (2006.01)

(52) U.S. Cl.
CPC .............. *G01S 5/0236* (2013.01); *G01S 5/14* (2013.01); *G01S 19/03* (2013.01); *G01S 19/14* (2013.01); *H04W 64/00* (2013.01); *B64C 2201/12* (2013.01); *B64C 2201/145* (2013.01)

(56) References Cited

FOREIGN PATENT DOCUMENTS

| KR | 101026286 | B1 | | 3/2011 |
|---|---|---|---|---|
| KR | 101165003 | B1 | | 7/2012 |
| KR | 101313721 | B1 | | 10/2013 |
| KR | 101365090 | | * | 2/2014 |
| KR | 101365090 | B1 | | 2/2014 |

OTHER PUBLICATIONS

ISA Korean Intellectual Property Office, International Search Report and Written Opinion Issued in Application No. PCT/KR2016/013336, dated Jan. 10, 2017, WIPO, 4 pages.

* cited by examiner

[FIG. 2]

APPARATUS FOR DETERMINING PRECISE LOCATION AND METHOD FOR DETERMINING PRECISE LOCATION IN WOODLANDS

CROSS-REFERENCE TO RELATED APPLICATIONS

The present application is a U.S. National Phase of International Patent Application Serial No. PCT/KR2016/013336 entitled "APPARATUS FOR DETERMINING PRECISE LOCATION AND METHOD FOR DETERMINING PRECISE LOCATION IN WOODLANDS," filed on Nov. 18, 2016. International Patent Application Serial No. PCT/KR2016/013336 claims priority to Korean Patent Application No. 10-2015-0161563, filed on Nov. 18, 2015. The entire contents of each of the above-cited applications are hereby incorporated by reference in their entirety for all purposes.

TECHNICAL FIELD

The present invention relates to an apparatus for determining a precise location and a method for determining a precise location in woodlands using the same, and more particularly, to an apparatus for determining a precise location capable of determining a precise location in an error range of about 20 cm even in woodlands by combining a global positioning system (GPS) and a broadband signal communication manner with each other, and a method for determining a precise location in woodlands using the same.

BACKGROUND ART

A GPS, which is an abbreviation of a global positioning system, is a system capable of accurately recognizing its location using an artificial satellite anywhere in the world. Information that may be obtained by the GPS is divided into location information such as latitude, longitude, and altitude, and accurate time information, and the GPS itself is divided into a civilian GPS and a military GPS. The military GPS has been used in only the US military developed the military GPS, and the civilian GPS has been opened to all the people, such that it has been used in various fields over the world. The most representative example of the civilian GPS used by the public is a navigation system, and is to use a path finding service by detecting a current location of an automobile or a portable phone in which the navigation system is installed. A GPS receiver theoretically receives signals from four GPS artificial satellites to specify its location. As a method in which the GPS receiver determines its location by itself, the GPS receiver obtains distance and time information from three of the four GPS artificial satellites and corrects an error by the other GPS artificial satellite to calculate a current location of the GPS by triangulation. An advantage of the GPS is to accurately recognize a location of the GPS with only a GPS antenna that is cheap and some equipment. Conventionally, an inertial navigation system using an apparatus such as a gyroscope for navigation should be used. However, the inertial navigation system is expensive and has a disadvantage that an error is accumulated over time, such that it is not commonly used for a civilian purpose.

As described above, the GPS tends to be utilized in various fields, and has been recently used in a measuring field using an unmanned aerial vehicle (UAV) such as a drone with the spread of the UAV. This is a manner in which a user operates an unmanned aerial vehicle mounted with a GPS receiver in a region to which it is difficult for a person to directly go, such as a jungle and an alpine region, to measure an area, altitude, and the like, of the corresponding region, and is disclosed in Korean Patent Laid-Open Publication No. 10-2003-0068871 (entitled "Reconnoitering System using Remotely Piloted Vehicle", published on Aug. 25, 2003, hereinafter referred to as Related Art Document 1). Related Art Document 1 has an effect that a location may be conveniently measured using an unmanned aerial vehicle, but has a problem that accurate measuring is impossible due to an error of several meters or more occurring by a multi-path error caused by trees in a forested place such as a jungle and an inner portion of woodlands.

The multi-path error is an error occurring since signals transmitted from satellites are refracted and reflected due to terrain features such as buildings, or the like, in the vicinity of a receiver, and are then received by the receiver through a multi-path. When the multi-path error occurs, a radio wave is refracted and reflected, such that an error may occur in information that is to be transmitted, and an error occurs in a transmission direction and distance of the radio wave. The multi-path error is generally corrected using a technology such as a narrow correlator, a specially designed antenna, or the like, which is not economical. Therefore, an apparatus for determining a precise location and a method for determining a precise location in woodlands using the same that are improved needs to be developed.

An object of the present invention is to provide an apparatus for determining a precise location capable of determining a precise location in an error range of about 20 cm even in a forested place such as woodlands, and a method for determining a precise location in woodlands using the same.

In one general aspect, an apparatus for determining a precise location includes: a plurality of unmanned aerial vehicles 100 each having a first broadband signal module 110 and a global positioning system (GPS) receiver 120 attached thereonto and flying in the air; and a terminal 200 provided at a predetermined location and determining its location by communication with the first broadband signal modules 110.

The terminal 200 may include: a second broadband signal module 210 receiving locations of the unmanned aerial vehicles 100 and distances between the unmanned aerial vehicles 100 and the terminal 200 by communicating with the first broadband signal modules 110; and a calculating unit 220 determining the location of the terminal 200 through the locations of the unmanned aerial vehicles 100 and the distances between the unmanned aerial vehicles 100 and the terminal 200 received by the second broadband signal module 210.

A frequency of wireless communication used by the first broadband signal module 110 and the second broadband signal module 210 may be 3 to 6 GHz (a bandwidth thereof may be 500 MHz to 1,000 MHz).

In another general aspect, a method for determining a precise location in woodlands using the apparatus for determining a precise location described above includes: an unmanned aerial vehicle location detecting step (S1) in which the respective GPS receivers 120 receive GPS signals from artificial satellites 300 and detect locations of each of the plurality of unmanned aerial vehicles 100; a location information transmitting step (S2) in which the first broadband signal modules 110 each included in the plurality of unmanned aerial vehicles 100 transmit locations of the unmanned aerial vehicles 100 and distances between the unmanned aerial vehicles 100 and the terminal 200 to the terminal 200 by communicating with the terminal 200; and a terminal location detecting step (S3) in which the location of the terminal 200 is determined using information received from the first broadband signal modules 110.

In the terminal location detecting step (S3), the location of the terminal 200 may be determined using trilateration.

Advantageous Effects

According to the present invention described above, since both of the GPS and the broadband signals are used, an error due to multi-path signals that may occur in the woodlands is minimized, such that a precise location in an error range of 20 cm in the woodlands may be determined.

In addition, according to the present invention, it is sufficient to attach the GPS receivers and the broadband signal modules to the unmanned aerial vehicles according to the related art, and an operation is thus convenient.

In addition, according to the present invention, since the GPS receivers and the broadband signal modules are used, the narrow correlator or the specially designed antenna according to the related art for correcting the multi-path signals are not used, which is economical.

DETAILED DESCRIPTION OF DRAWINGS

Before an apparatus for determining a precise location and a method for determining a precise location in woodlands using the same according to the present invention are described, a global positioning system (GPS) and signal characteristics of broadband signals used in the present invention are described. A GPS satellite converts a C/A code and a P code, which are identification information of the satellite, and navigation message information, which is orbit information of the satellite, into signals and carries and transmits the signals to the ground on two bands of L1 and L2 waves, and the L1 and L2 waves are called carrier waves. A GPS terminal on the ground measures a distance between the satellite and the GPS terminal using two manners, which are a code signal measuring manner and a carrier wave signal measuring manner, and the L1 and L2 waves. The code signal measuring manner is a manner of calculating the distance by comparing a code transmitted from the satellite and a code copied in advance in the receiver with each other, observing a time required until the two codes completely coincide with each other, and multiplying the time by a propagation speed, and the carrier wave signal measuring manner is a manner of calculating the distance by measuring the number of wavelengths between the GPS satellite and the GPS terminal since carrier waves carrying code signals are sinusoidal waves and have constant wavelengths (the L1 wave has a frequency of 1,575.42 MHz and a wavelength of about 19 cm and the L2 wave has a frequency of 1,227.60 MHz and a wavelength of about 24 cm).

A broadband signal used in the present invention is often called an ultra-wideband (UWB) and is a wireless communication technology of transmitting a large amount of information at a low power over a very wide band as compared to an existing spectrum, and uses a frequency band of 3 to 6 GHz (a bandwidth maximum speed of 500 MHz to 1,000 MHz) in a broad sense, such that a length of a signal train (pulse) is 30 to 60 cm or less. Therefore, since the broadband signal is a high frequency signal, the broadband signal has good transmissivity and the length of the signal train of the broadband signal is short to minimize an error due to a multi-path, such it has a distance measuring accuracy up to 10 cm.

Hereinafter, an apparatus for determining a precise location according to the present invention is described in detail with reference to the accompanying drawings.

Figure 1:
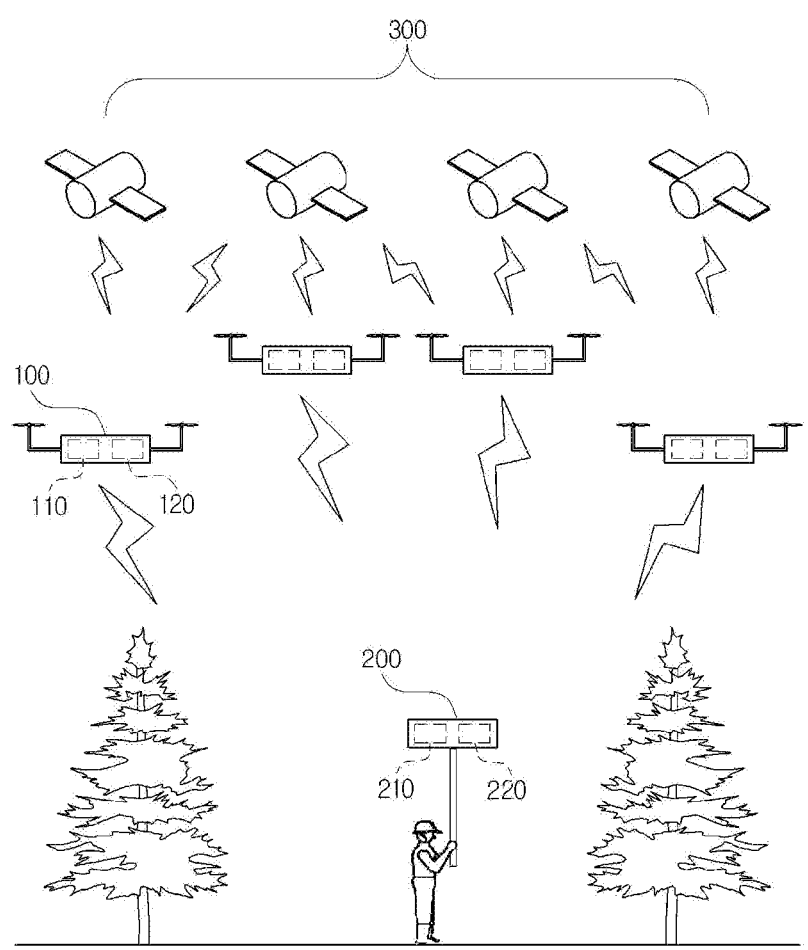
FIG. 1 is a conceptual diagram illustrating an apparatus for determining a precise location according to the present invention.

As illustrated in FIG. 1, the apparatus for determining a precise location according to the present invention is configured to include unmanned aerial vehicles 100 and a terminal 200.

As illustrated in FIG. 1, the number of unmanned aerial vehicles 100 is plural, and each of the unmanned aerial vehicles 100 has a first broadband signal module 110 and a GPS receiver 120 attached thereonto and flies in the air of woodlands. The unmanned aerial vehicle 100 serves to transmit auxiliary information for determining a location of the terminal 200, and is manipulated by a user operating the apparatus for determining a precise location according to the present invention to fly over the surrounding of the terminal 200. The unmanned aerial vehicle 100 may be a drone available from the surrounding and flown by including a plurality of rotary wings or an unmanned aircraft vehicle having horizontal wings, and the first broadband signal module 110 using the broadband signal described above and the GPS receiver 120 receiving a GPS signal from a GPS satellite are attached onto the unmanned aerial vehicle 100. The first broadband signal module 110, which is a component for communicating with the terminal 200 on the ground, uses the broadband signal described above, and the GPS receiver 120 is a component receiving the GPS signal from the GPS satellite and determining a location of the unmanned aerial vehicle 100 provided with the GPS receiver 120.

The number of unmanned aerial vehicles 100 transmitting the broadband signals in order to determine a location of any one point is generally plural, and three or more unmanned aerial vehicles 100 are used in order to perform triangulation or trilateration. At least three unmanned aerial vehicles 100 are required in order to perform the triangulation or the trilateration, but four unmanned aerial vehicles 100 are generally used, as illustrated in FIG. 1. This is to make a location of the terminal 200 communicating with the unmanned aerial vehicles 100 accurate, and is to correct a location information error that may occur. A method for determining a precise location in woodlands using an apparatus for determining a precise location according to the present invention to be described below uses the trilateration, which is a method capable of specifying a location of a specific point X when locations of three different places A, B, and C in a two-dimensional coordinate system and distances between A, B, and C and X are recognized. The trilateration is described below.

The terminal 200, which is a component provided at a predetermined location and determining its location by communication with the first broadband signal module 110, is configured to include, disposed on the terminal, both a second broadband signal module 210 and a calculating unit 220. The terminal 200 is generally positioned on the ground, and is positioned in woodlands as described below in the method for determining a precise location in woodlands using the apparatus for determining a precise location according to the present invention. For example, as shown in FIG. 1, the terminal may comprise a component sized to be portable and capable of being held by a person, the component including the second broadband signal module 210 and the calculating unit 220 disposed thereon. An object of the apparatus for determining a precise location according to the present invention is to determine a precise location of the terminal 200. The terminal 200 may include a separate antenna disposed at an upper portion thereof in order to enable easy reception of the broadband signals, as illustrated in FIG. 1. The terminal 200 may be held by a person, as shown in FIG. 1, so that the terminal 200, and its second broadband signal module 210 and calculating unit 220 disposed thereon, may extend upward in a direction toward a plurality of unmanned aerial vehicles 100 flying in the air at varying distances above the terminal 200.

The second broadband signal module 210 receives locations of the unmanned aerial vehicles 100 and distances between the unmanned aerial vehicles 100 and the terminal 200 by communicating with the first broadband signal modules 110. The second broadband signal module 210 uses the broadband signals as in the first broadband signal modules 110, and uses a method of measuring a distance between two terminals by converting a time required (delayed) for the broadband signal pulse transmitted from the unmanned aerial vehicle 100 to arrive at the terminal 200 into a distance.

Figure 3:
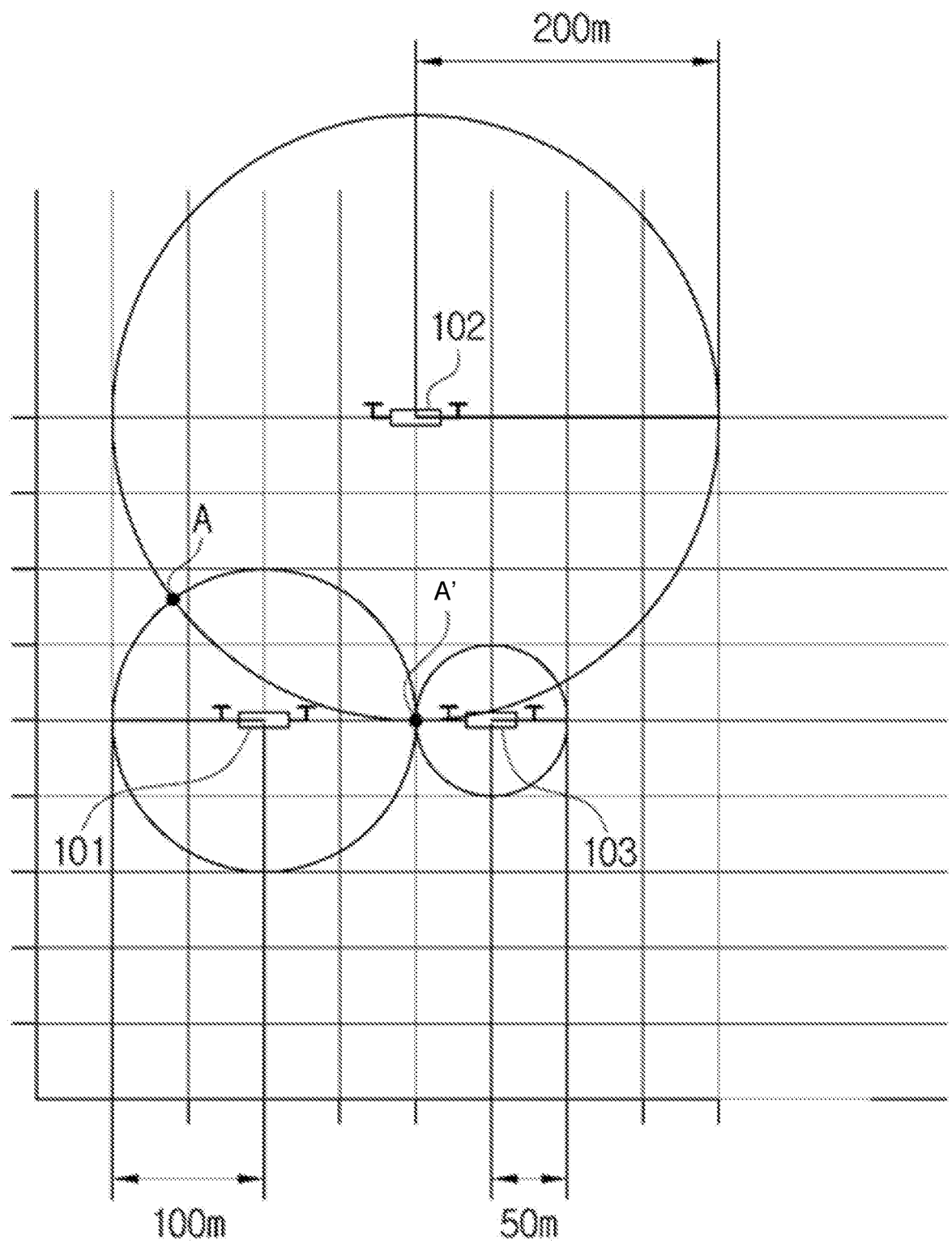
FIG. 3 is a conceptual diagram illustrating trilateration according to the present invention.

The calculating unit 220 determines the location of the terminal 200 through the locations of the unmanned aerial vehicles 100 and the distances between the unmanned aerial vehicles 100 and the terminal 200 received by the second broadband signal module 210. Locations of the four unmanned aerial vehicles 100 illustrated in FIG. 1 are in a state in which they are detected through the GPS receivers 120, and distances between the four unmanned aerial vehicles 100 and the terminal 200 are also in a state in which they are detected through communication between the first broadband signal modules 110 and the second broadband signal module 210. When distances between the three unmanned aerial vehicles 100 of which the locations are confirmed and the terminal 200 of which the precise location is to be measured are recognized, the location of the terminal 200 may be determined. This is illustrated in FIG. 3, and is described in detail when a method for determining a precise location in woodlands using an apparatus for determining a precise location according to the present invention is described.

A frequency of wireless communication used by the first broadband signal module 110 and the second broadband signal module 210 is 3 to 6 GHz (a bandwidth thereof is 500 MHz to 1,000 MHz). Generally, in the case in which a frequency in a GHz unit (a transmission bandwidth) is 100 MHz, this is considered as a broadband signal, and the first broadband signal module 110 and the second broadband signal module 210 use the broadband signals as described above. The reason why the unmanned aerial vehicle 100 communicates with the terminal 200 positioned on the ground using the broadband signals is to overcome the multi-path error described in the Background Art. As described above, the multi-path error is an error occurring since several radio wave reception paths are formed by reflection of a radio wave on high structures such as buildings or trees. The radio wave is a kind of wavelength, a property of the radio wave is determined by a frequency of the radio wave, and as the frequency of the radio wave becomes high, the radio wave has a property close to light, such that straightness of the radio wave becomes strong, and transmission of the radio wave in a specific direction becomes advantageous, that is, directivity of the radio wave becomes excellent. In addition, reflectivity of the radio wave is decreased and transmissivity of the radio wave is increased, and in the woodlands, a radio wave having a low frequency at which diffraction is generated well in order to receive a specific radio wave is advantageous, but in the case in which a specific position is determined in real time as in the present invention, it is advantageous to use a radio wave having a high frequency and a wide bandwidth. The reason is that the radio wave having the high frequency and the wide bandwidth has strong straightness and discrimination between a straight travel signal and a diffraction signal is easy, as described above, such that the terminal 200 may catch only the straight travel signal. That is, since the second broadband signal module 210 included in the terminal 200 communicates with the first broadband signal module 110 included in the unmanned aerial vehicle 100 by the broadband signals, it may determine an accurate location of the terminal 200.

The distance between the unmanned aerial vehicle 100 and the terminal 200 may be up to 1 km corresponding to a distance at which the broadband communication is possible, but may be within 300 m in consideration of the woodlands and in order to determine a precise location through accurate distance calculation. An operating distance of the apparatus for determining a precise location according to the present invention, that is, the distance between the unmanned aerial vehicle 100 and the terminal 200 may be changed depending on the frequency of the broadband communication, a weather environment, and an operating region.

Hereinafter, a method for determining a precise location in woodlands using the apparatus for determining a precise location according to the present invention is described in detail.

Figure 2:
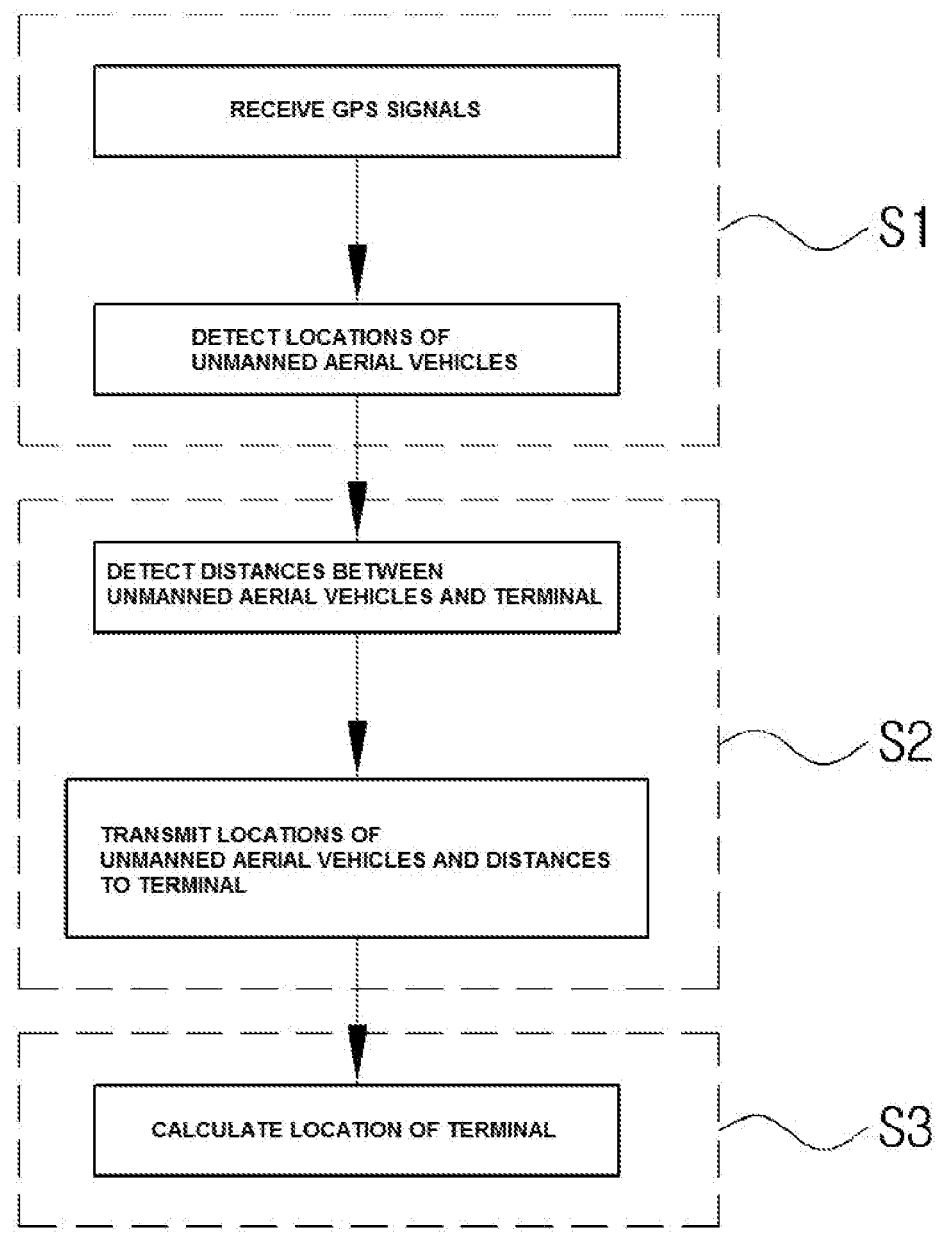
FIG. 2 is a flow chart illustrating a method for determining a precise location in woodlands using the apparatus for determining a precise location according to the present invention.

As illustrated in FIG. 2, the method for determining a precise location in woodlands using the apparatus for determining a precise location according to the present invention is configured to include an unmanned aerial vehicle location detecting step (S1), a location information transmitting step (S2), and a location detecting step (S3).

In the unmanned aerial vehicle location detecting step (S1), the respective GPS receivers 120 receive GPS signals from artificial satellites 300 and detect locations of each of the plurality of unmanned aerial vehicles 100. Since the method for determining a precise location in woodlands according to the present invention uses the apparatus for determining a precise location described above, the number of unmanned aerial vehicles 100 of which the locations need to be detected is four as illustrated in FIG. 1, and the reason why the number of unmanned aerial vehicles 100 of which the locations need to be detected is four is described above. When the locations of the unmanned aerial vehicles 100 are detected through the GPS receivers 120, general GPS satellites are used, and separate obstacles do not exist between the plurality of unmanned aerial vehicles 100 and the GPS satellites. Therefore, accurate locations of latitude, longitude, and altitude for unmanned aerial vehicle 100 may be determined.

In the location information transmitting step (S2), the first broadband signal modules 110 each included in the plurality of unmanned aerial vehicles 100 transmit the locations of the unmanned aerial vehicles 100 and the distances between the unmanned aerial vehicles 100 and the terminal 200 to the terminal 200 by communicating with the terminal 200. The terminal 200 is positioned in the woodlands, and the respective first broadband signal modules 110 communicate with the terminal 200 using the broadband signals having a short wavelength and may thus transmit the distances between the unmanned aerial vehicles 100 and the terminal 200 and the locations of the unmanned aerial vehicles 100 to the terminal 200 in real time regardless of trees existing in the woodlands.

In the location detecting step (S3), the location of the terminal 200 is determined using information received from the first broadband signal modules 110. In the location detecting step (S3), the location of the terminal 200 is determined through trilateration. FIG. 3 illustrates a method for determining the location of the terminal 200 through the trilateration in a state in which the distances between the unmanned aerial vehicles 100 and the terminal 200 and the locations of the unmanned aerial vehicles 100 are determined, and illustrates a first unmanned aerial vehicle 101, a second unmanned aerial vehicle 102, and a third unmanned aerial vehicle 103, and distances between the respective unmanned aerial vehicles and the terminal 200. As illustrated in FIG. 3, a distance between the first unmanned aerial vehicle 101 of which a location and the terminal 200 is determined is 100 m. The location of the terminal 200 may not be specified only by a distance between the first unmanned aerial vehicle 101 and the terminal 200, but a circle having a radius of 100 m around the first unmanned aerial vehicle 101 is drawn. The circle having the radius of 100 m around the first unmanned aerial vehicle 101 is a candidate of a location in which the terminal 200 exists. As illustrated in FIG. 3, a distance between the second unmanned aerial vehicle 102 of which a location is determined and the terminal 200 is 200 m, and a circle having a radius of 200 m around the second unmanned aerial vehicle 102 is thus drawn. A point A and a point A' corresponding points at which the circle around the first unmanned aerial vehicle 101 and the circle around the second unmanned aerial vehicle 102 meet each other are candidates of the location of the terminal 200. As illustrated in FIG. 3, a distance between the third unmanned aerial vehicle 103 of which a location is determined and the terminal 200 is 50 m, and when a circle having a radius of 50 m around the third unmanned aerial vehicle 103 is drawn, it may be appreciated that the point A' is overlapped. Therefore, the point A' is the location of the terminal 200.

In FIG. 3, a process of determining the location of the terminal 200 in a two-dimensional coordinate system is illustrated, and three unmanned aerial vehicles 100 are required. Since an actually used environment is a three dimension, in the case of detecting a specific location in the same time in a three-dimensional coordinate system, a sphere around a single unmanned aerial vehicle 100 becomes a candidate of a position of the terminal 200, and a circle formed by overlapping spheres around two different unmanned aerial vehicles 100 with each other becomes a candidate of the location of the terminal 200. In the form as described above, portions at which three spheres are overlapped with one another become two points, and portions at which four spheres are overlapped with one another become a point, such that the location of the terminal 200 is determined. As described above, four unmanned aerial vehicles 100 are required in order to determine the location of the terminal 200 in the same time. However, actually, the terminal 200 is in a state in which the location is fixed, the candidates of the location of the terminal 200 may be decreased in a manner of decreasing the candidates of the location of the terminal 200 while the first unmanned aerial vehicle 101, the second unmanned aerial vehicle 102, and the third unmanned aerial vehicle 103 moving over time, and at least three unmanned aerial vehicles 100 may thus be operated. However, generally, the four unmanned aerial vehicles 100 are operated.

The apparatus for determining a precise location and the method for determining a precise location in woodlands using the same according to the present invention may be useful for land surveying and measuring or be used for enjoying leisure, in woodlands, jungle, and a region having many high structures, such as a downtown. Particularly, in Korea, there are many mountainous regions and portions in which locations of mountaineering roads of the respective mountains are clearly marked are not many. However, the present invention may be simply applied to measuring of the woodlands and the mountainous regions. In addition, the present invention may be usefully used for rescue and salvage. For example, when an apparatus in which the terminal 200 is embedded is lent at an entrance of a mountaineering road and a user meets with a disaster while climbing the corresponding mountain, the present invention is utilized to operate the unmanned aerial vehicles 100 to find the location of the terminal 200 held by the user and facilitate the rescue of the user. However, when the present is to be applied to the rescue or the salvage, some of the components are modified so that the location of the terminal 200 held by a person meeting with a disaster is transmitted to the outside or the unmanned aerial vehicles 100 so that it may be recognized by a rescue team.

The present invention is not limited to the abovementioned exemplary embodiments, and may be variously applied, and may be variously modified without departing from the gist of the present invention claimed in the claims.

The invention claimed is:

1. An apparatus for determining a. precise location in woodlands, comprising:
   at least three unmanned aerial vehicles flying in the air of the woodlands. each of the at least three unmanned aerial vehicles having a global positioning system (GPS) receiver attached thereto to receive a GPS signal from artificial satellites to detect a location thereof, and each of the at least three unmanned aerial vehicles transmitting a broadband signal including information about the location of each of the at least three unmanned aerial vehicles; and
   a portable terminal provided on a ground of the woodlands, the portable terminal having an antenna, receiving broadband signals through the antenna, and measuring distances between each of the at least three unmanned aerial vehicles and the portable terminal using time delays for the broadband signals to be transmitted from the at least three unmanned aerial vehicles to the portable terminal, wherein a location of the portable terminal is determined through trilateration using the received information about the location of each of the at least three unmanned aerial vehicles and the measured distance between each of the at least three unmanned aerial vehicles and the portable terminal, and
   wherein a frequency of wireless communication of the broadband signal used by the at least three unmanned aerial vehicles and the portable terminal is 3 to 6 GHz and a bandwidth of the broadband signal is 500 MHz to 1,000 MHz.

2. The apparatus of claim 1, wherein the portable terminal is farther to transmit the location of the portable terminal.

3. A method for determining a precise location in woodlands, comprising:
- receiving global positioning system (UPS) signals from artificial satellites at each of at least three unmanned aerial vehicles flying in the air of the woodlands:
- detecting, at each of the at least three unmanned aerial vehicles, a location thereof based on the GPS signals:
- transmitting, from each of the at least three unmanned aerial vehicles, a broadband signal including information about the location thereof;
- receiving each of the broadband signals at a terminal provided on a ground of the woodlands;
- converting, at the terminal, a time delay between the transmission of each of the broadband signals and the reception of that broadband signal into a distance between a corresponding unmanned aerial vehicle and the terminal; and determining, at the terminal, a location of the terminal through trilateration using the location of each of the at least three unmanned aerial vehicles and the distances between each of the at least three unmanned aerial vehicles and the terminal,
- wherein the broadband signals transmitted from the at least three unmanned aerial vehicles and received at the terminal have a frequency of between 3 gigahertz (GHz) and 6 GHz, and a bandwidth of between 500 megahertz (MHz) and 1,000 MHz.

4. The method of claim 3, further comprising transmitting the location of the portable terminal.

* * * * *